United States Patent
Carpenter et al.

(10) Patent No.: US 7,217,073 B2
(45) Date of Patent: May 15, 2007

(54) BROACH TOOL HOLDING SYSTEM, BROACH TOOL, AND METHOD FOR MOUNTING THE BROACH TOOL

(75) Inventors: Glenn Roy Carpenter, Clayton, MI (US); Clifford R. Middleton, Sand Creek, MI (US)

(73) Assignee: Utica Enterprises, Inc., Shelby Township, MI (US)

( * ) Notice: Subject to any disclaimer, the term of this patent is extended or adjusted under 35 U.S.C. 154(b) by 457 days.

(21) Appl. No.: 10/935,495

(22) Filed: Sep. 7, 2004

(65) Prior Publication Data

US 2006/0051175 A1    Mar. 9, 2006

(51) Int. Cl.
*B23F 41/04* (2006.01)
*B23F 43/02* (2006.01)

(52) U.S. Cl. .................. 409/244; 407/14; 409/287

(58) Field of Classification Search ............... 409/244, 409/287, 259, 260; 407/14, 16, 19; *B23D 41/04, B23D 43/00, 43/02; B23F 21/26*
See application file for complete search history.

(56) References Cited

U.S. PATENT DOCUMENTS

| | | | | |
|---|---|---|---|---|
| 2,304,185 A | * | 12/1942 | Lee | 407/14 |
| 2,629,294 A | * | 2/1953 | Kopec | 409/249 |
| 3,331,115 A | * | 7/1967 | Daniel | 407/14 |
| 3,332,129 A | * | 7/1967 | Psenka | 407/14 |
| 4,518,289 A | * | 5/1985 | Gabriele | 409/244 |
| 5,315,750 A | * | 5/1994 | Roseliep | 29/563 |
| 5,352,076 A | * | 10/1994 | Garden | 409/287 |
| 5,878,642 A | | 3/1999 | Roseliep | |
| 6,256,857 B1 | | 7/2001 | Roseliep | |
| 6,648,568 B2 | | 11/2003 | Roseliep | |

FOREIGN PATENT DOCUMENTS

GB    1304413 A  *  1/1973

* cited by examiner

*Primary Examiner*—Daniel W. Howell
(74) *Attorney, Agent, or Firm*—Brooks Kushman P.C.

(57) ABSTRACT

A broach tool holding system (20) includes a pair of locator pins (46) rotatably mounted on a tool holder plate (36) to facilitate mounting and detachment of an associated broach tool (34). The broach tool (34) has a pair of locating openings (62) each of which has a locating hole (64) including round clearance surfaces (70) and round locating surfaces (72) that cooperate with the locator pins to provide the mounting in an accurately positioned location. The method of mounting the broach tool utilizing the rotatable locator pins (46) facilitates the mounting of the broach tool (34) with the locating holes that also facilitate the mounting and with securement being provided by clamps (74) for the broaching operation.

20 Claims, 5 Drawing Sheets

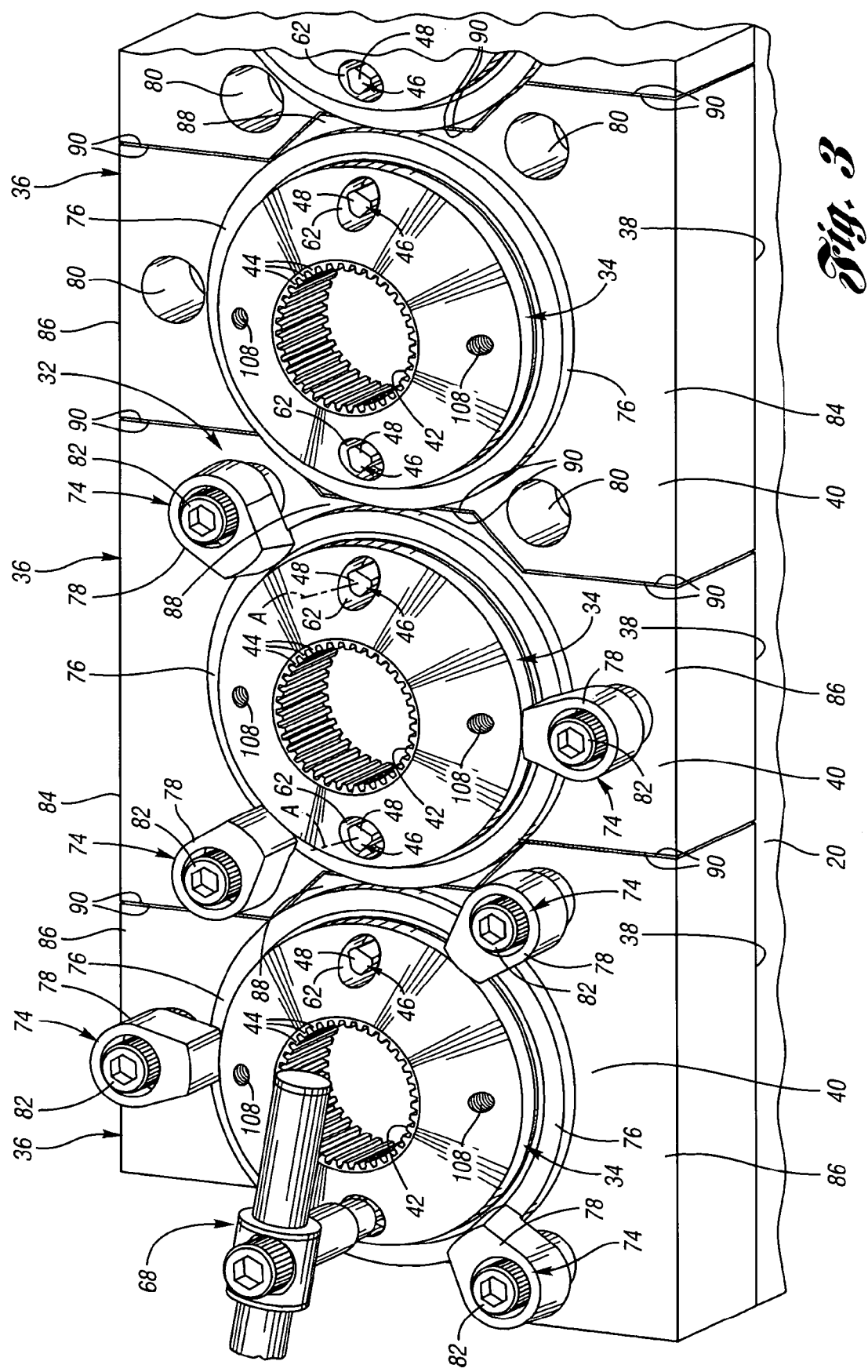

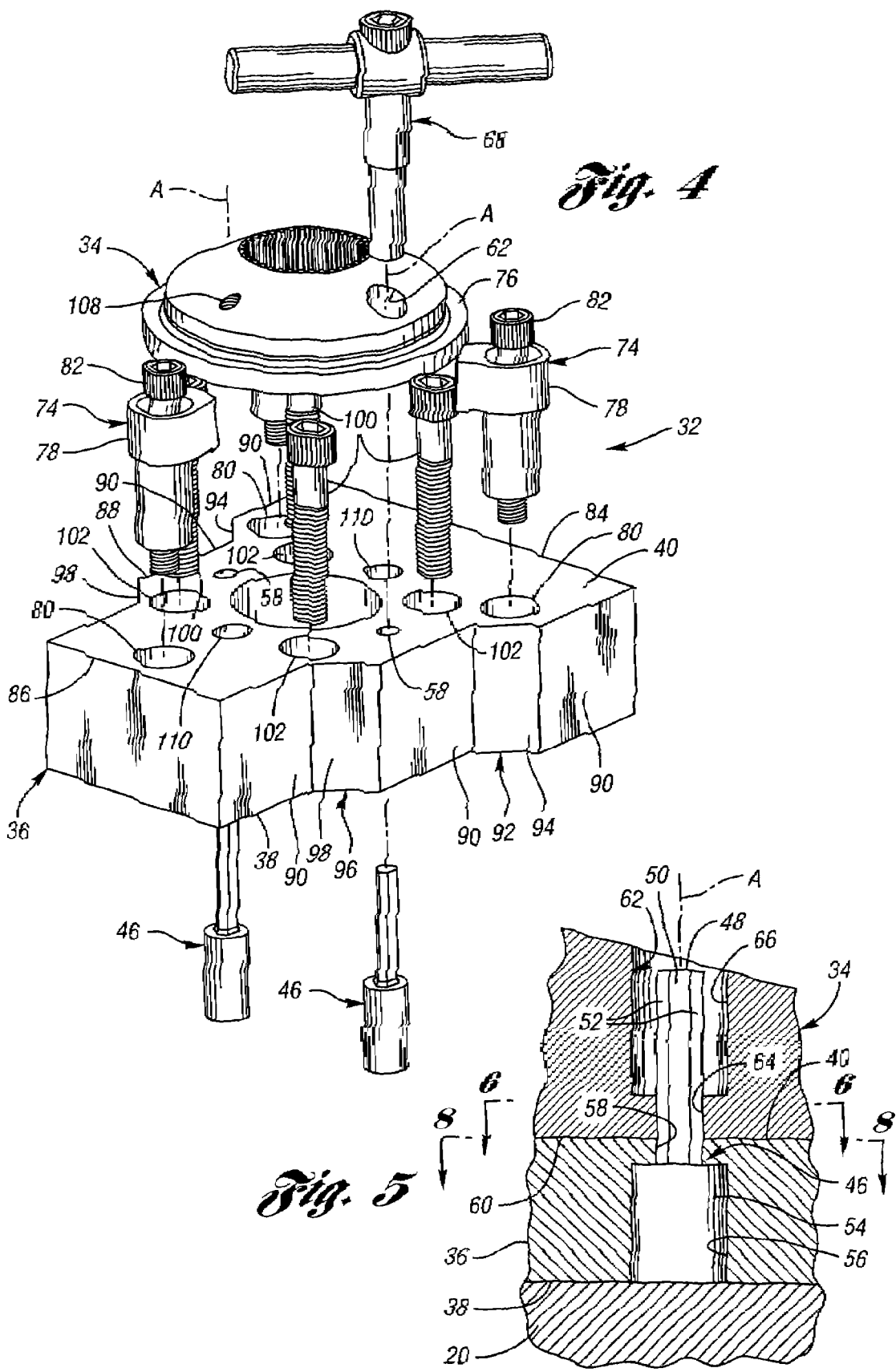

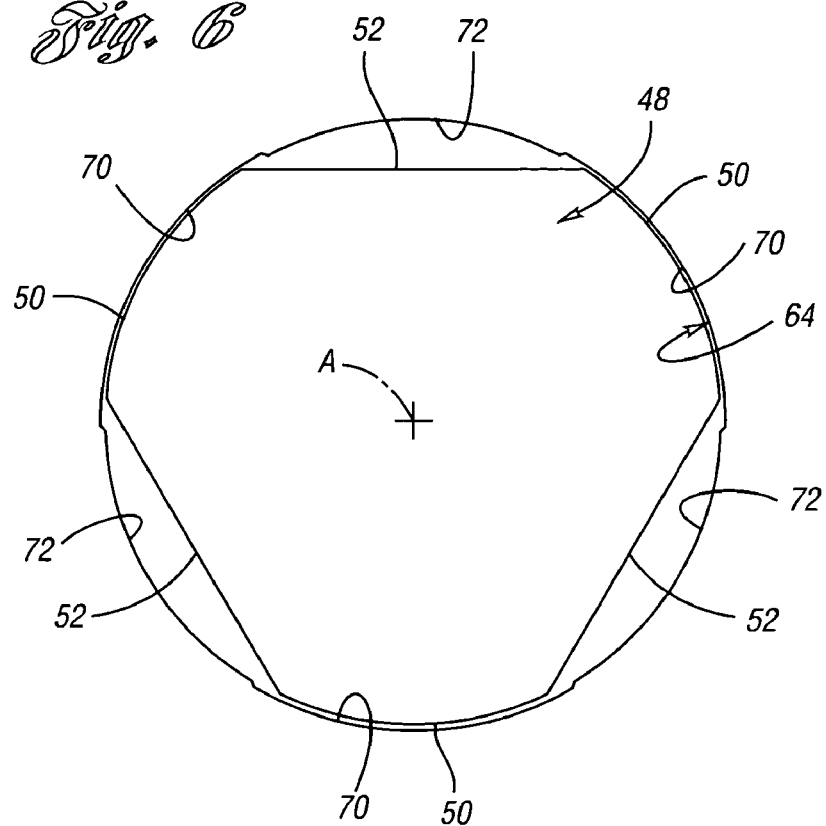
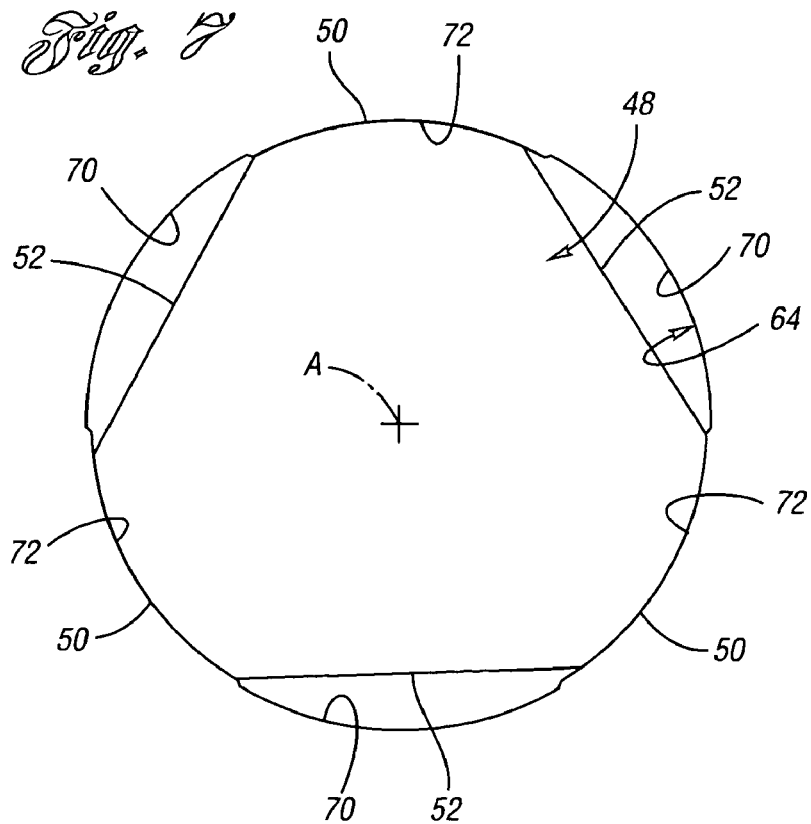

BROACH TOOL HOLDING SYSTEM, BROACH TOOL, AND METHOD FOR MOUNTING THE BROACH TOOL

BACKGROUND OF THE INVENTION

1. Field of the Invention

This invention relates to a broach tool holding system, to a broach tool utilized with the holding system, and to a method for mounting the broach tool for use.

2. Background Art

Broach tools are mounted on broaching machines to provide material removal broaching operations, usually with a number of the tools that provide the broaching in progressive steps. Such broaching can be performed either on a rotary table type machine or a reciprocal slide type machine. In order to provide accurate location of a broach tool, it is conventional to provide mounting thereof on a tool holder that is mounted on the rotary table or reciprocal slide of the broaching machine used.

U.S. Pat. No. 5,878,642 Roseliep and U.S. Pat. No. 6,256,857 Roseliep disclose one manner in which broach tools can be accurately mounted on a broach machine by two spaced abutment surfaces and a wedge member that engage flat lateral surfaces of the broach tool to provide mounting.

SUMMARY OF THE INVENTION

One object of the present invention is to provide an improved broach tool holding system.

In carrying out the above object, the broach tool holding system of the invention includes a tool holder plate having a mounting surface for providing support thereof on a broaching machine and having a tool surface for mounting a broach tool for performing broaching. A pair of locator pins are mounted on the tool holder plate for rotation about spaced axes that are parallel to each other. Each locator pin has a locator end that projects from the tool holder plate and has round locating surfaces spaced circumferentially about the associated axis from each other. The locator end of each locator pin also has clearance surfaces circumferentially alternating with the round locating surfaces and extending therebetween at locations radially inward from the round locating surfaces. The round locating surfaces of the locator ends of the locator pins are rotationally aligned with circumferentially spaced clearance surfaces in locating holes in the broach tool to facilitate initial positioning of the broach tool on the tool holder plate. The locator pins are rotatable on the tool holder plate to rotate the locating surfaces thereof from alignment with the clearance surfaces in the locating holes of the broach tool into locating contact with circumferentially spaced locating surfaces in the locating holes in the broach tool to position the broach tool on the tool holder plate in a predetermined location. Clamps of the holding system secure the located broach tool on the tool holder plate for use, and the clamps selectively release the broach tool for detachment which is performed after rotation of the locator pins to rotate the locating surfaces thereof out of contact with the circumferentially spaced locating surfaces in the locating holes of the broach tool and into alignment with the clearance surfaces thereof to facilitate the detachment.

The construction of the tool holder plate has a large end, a small end and an intermediate portion between the large and small ends. The large and small ends as well as the intermediate portion each have a pair of oppositely facing parallel surfaces that are respectively spaced from each other by large, small and intermediate distances so a plurality of such tool plates can be positioned adjacent each other with the adjacent tool holder plates oriented 180° from each other so the large ends are adjacent the small ends of adjacent tool holders with the intermediate portions therebetween to provide relatively close positioning of broach tools mounted on the tool holder plates.

The pair of locator pins are mounted on the intermediate portion of each tool holder plate respectively adjacent the oppositely facing surfaces of the intermediate portion. Also, there are three clamps, two of which are mounted on the large end of the tool holder plate respectively adjacent its oppositely facing surfaces, and one of which is mounted on the small end of the tool holder plate generally midway between its oppositely facing surfaces. Further, the broach tool holding system includes four attachment bolts and the tool holder plate includes four attachment bolt holes through which the attachment bolts extend to attach the tool holder plate to the broaching machine. These four attachment holes are located in pairs respectively adjacent junctions of the intermediate portion of the tool holder plate with its large and small ends.

The clearance surfaces of the locator ends of the pair of locator pins are flat and extend as chords between the adjacent locating surfaces of the locator ends of the pair of locator pins. The locator end of each locator pin has three locating surfaces and three clearance surfaces.

The tool holder plate includes a pair of locating openings that respectively receive the locating ends of the pair of locator pins. Each locating opening of the tool holder plate has a stop that provides rotational positioning of the associated locating pin for alignment of the locating surfaces thereof with the clearance surfaces in the locating holes of the broach tool to facilitate the broach tool mounting.

Another object of the present invention is to provide an improved broach tool.

In carrying out the immediately preceding object, the broach tool of the invention includes a tool body having a mounting surface for mounting on a mounting surface of a broach tool holder plate. A pair of locating holes extend through the tool body about associated spaced and parallel axes. Each locating hole has a plurality of round clearance surfaces spaced circumferentially from each other about its associated axis. Each locating hole also has a plurality of round locating surfaces spaced circumferentially from each other about its associated axis in an alternating relationship with the clearance surfaces and having a smaller radius than the clearance surfaces.

Each locating hole of the broach tool is constructed with three round clearance surfaces and three round locating surfaces.

Another object of the present invention is to provide an improved method for mounting a broach tool.

In carrying out the immediately preceding object, the method for mounting a broach tool in accordance with the invention is performed by positioning the broach tool on a broach tool holder plate with a pair of rotatable spaced and parallel locator pins on the holder plate respectively extending into a pair of locating holes in the broach tool with circumferentially spaced locating surfaces of each locator pin in alignment with circumferentially spaced clearance surfaces of the associated locating hole to provide initial positioning of the broach tool on the holder plate. The locator pins are rotated to move the locating surfaces thereof into contact with circumferentially spaced locating surfaces of the locating holes to provide positioning of the broach tool in a predetermined location on the holder plate. Thereafter, the located broach tool is clamped on the holder plate for use.

The locator pins are rotated by a wrench that contacts circumferentially spaced clearance surfaces which connect the locating surfaces of the locator pins. The rotation of each locator pin is terminated by an associated stop of the tool holder plate.

After the mounting, the broach tool is selectively detached by unclamping the clamps and rotating the locator pins to realign their locating surfaces with the clearance surfaces of the locator holes of the broach tool in a manner that facilitates the detachment.

The objects, features and advantages of the present invention are readily apparent from the following detailed description of the preferred embodiment when taken in connection with the accompanying drawings.

BRIEF DESCRIPTION OF THE DRAWINGS

FIG. 3 is a perspective view of the broach tool holding system of the invention.

FIG. 4 is an exploded perspective view of the broach tool holding system of the invention.

FIG. 5 is a partial sectional view taken through a slide support of the broaching machine, a tool holder plate of the tool holding system, and the broach tool and also illustrates a locator pin that cooperates with another locator pin to provide location of the broach tool.

FIG. 6 is a schematic view taken along the direction of line 6—6 in FIG. 5 to illustrate the manner in which locating surfaces of locator pins of the tool holding system are aligned with clearance surfaces of locating holes of the broach tool to permit the initial mounting of the broach tool on the tool holder plate as illustrated in FIG. 3.

FIG. 7 is a view similar to FIG. 6 after the locator pin has been rotated to a locked position with locating surfaces thereof in contact with locating surfaces of locating holes in the broach tool to provide its location on the tool holder plate.

DETAILED DESCRIPTION OF THE PREFERRED EMBODIMENT

Figure 1:
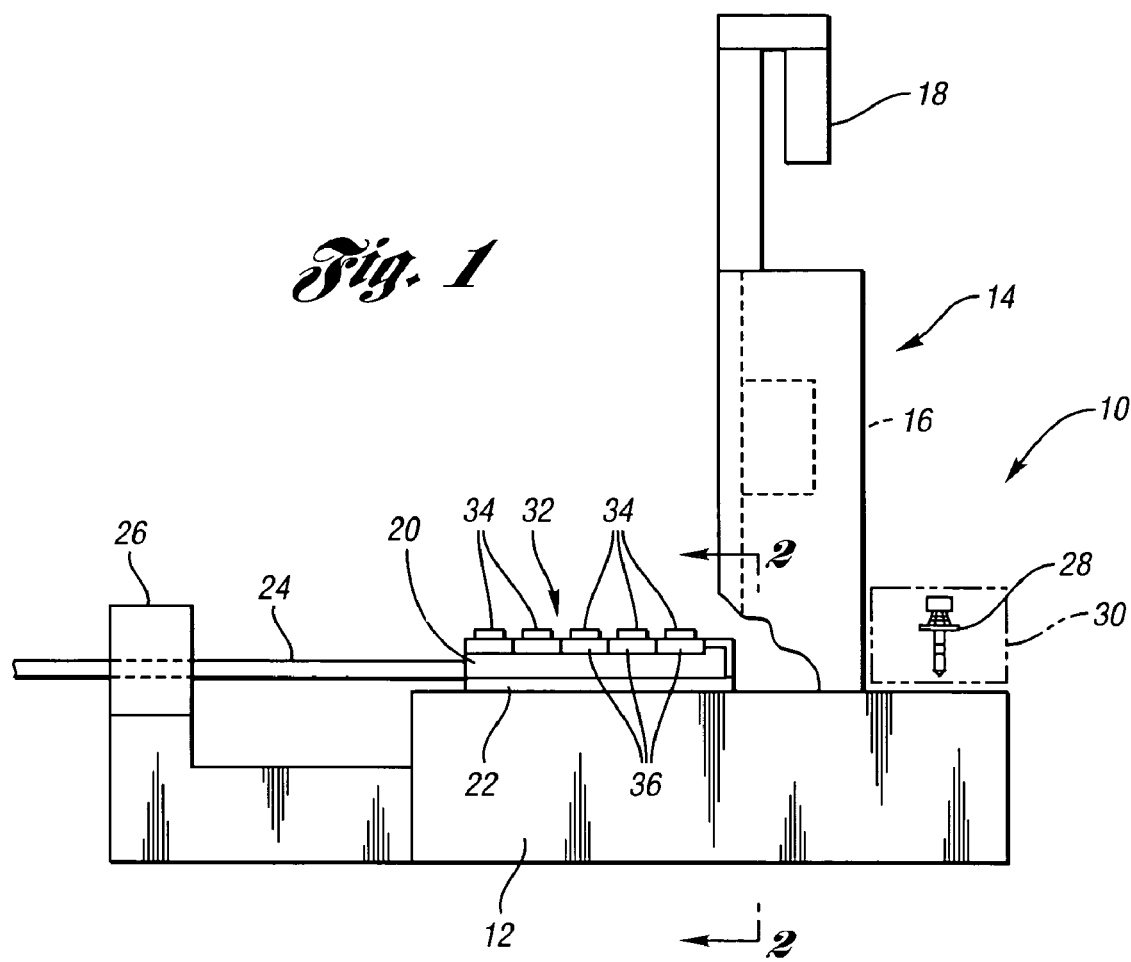
FIG. 1 is a side elevational view of a broaching machine which includes a broach tool holding system constructed in accordance with the invention.
Figure 2:
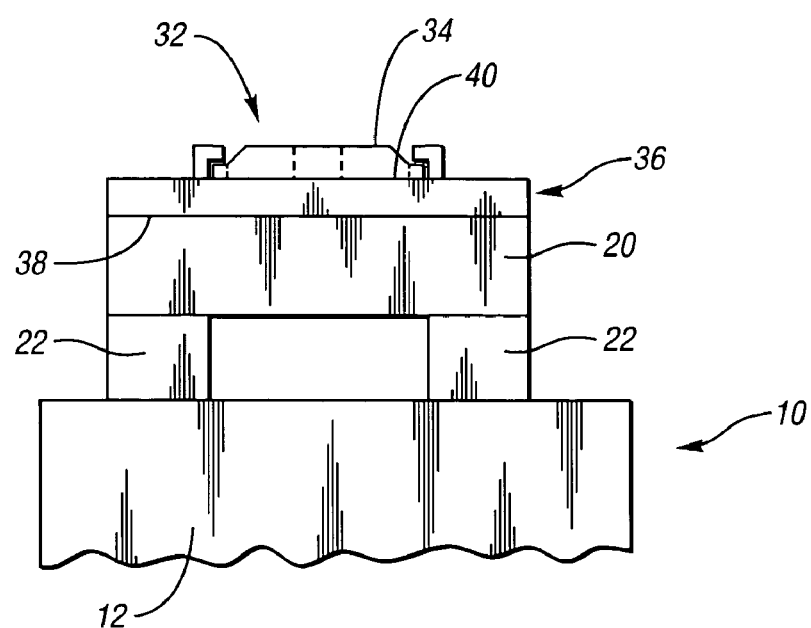
FIG. 2 is an end view of the broaching machine and its broach tool holding system taken along the direction of line 2—2 in FIG. 1.

With reference to FIGS. 1 and 2 of the drawings, a broaching machine generally indicated by 10 includes a base 12 that supports an upstanding broaching ram assembly 14 having a broaching ram 16 that is driven vertically by an actuator 18 to provide broaching upon downward movement and return upward movement in preparation for the next cycle. The machine base 12 also supports a reciprocal slide 20 that is supported by a pair of linear bearings 22 for horizontal movement by an actuator rod 24 that is moved by a suitable actuator 26. The slide 20 has accommodations to receive workpieces 28 from a supply conveyor 30. The workpieces are cyclically transferred to the ram assembly 16 for broaching.

As shown in FIGS. 1–3, a broach tool holding system 32 constructed in accordance with the present invention provides mounting of broach tools 34 on the machine slide 20 of the broaching machine. As illustrated, there are a plurality of the broach tools which perform broaching in a progressive manner, although the tool holding system could also be applicable with single tool broaching machines. Furthermore, while the tool holding system is illustrated in connection with a reciprocal linear broaching machine, it is also possible to utilize the broach tool holding system of the invention with rotary broaching machines of the rotary table type. The invention also involves the construction of the broach tool 34 and the method by which the broach tool is mounted on the broaching machine. The broach tool holding system 20, the construction of the broach tool 34, and the method for mounting the broach tool will be described in an integrated manner to facilitate an understanding of all aspects of the invention.

As illustrated in FIGS. 2 and 3, the broach tool holding system 32 includes a tool holder plate 36 that is associated with each broach tool 34. Each tool holder plate 36 has a mounting surface 38 for providing support thereof on the broaching machine such as on the linear machine slide 20 as illustrated. Each tool holder plate 36 also has a tool support surface 40 for mounting the associated broach tool 34 for performing broaching within a broaching opening 42 that has circumferentially spaced broaching teeth 44. These broaching teeth from one broach tool 34 to the next have shapes and positioning for providing progressive broaching as illustrated with a plurality of the broach tools in a conventional manner. While not illustrated, it is also possible for the broach tool to have a shaft construction with external teeth for broaching an internal hole in a part, as opposed to the illustrated hole with internal teeth for broaching external teeth on a shaft.

As illustrated in FIGS. 3–7, a pair of locator pins 46 are mounted on each tool holder plate 36 for rotation about spaced axes A that are parallel to each other. Each locator pin 46 as best illustrated in FIG. 5 has a locator end 48 that projects from the tool holder plate 36 and has round locating surfaces 50 spaced circumferentially about the associated axis A from each other. The locator end 48 of each pin also has clearance surfaces 52 circumferentially alternating with the round locating surfaces 50 and extending therebetween at locations radially inward from the round locating surfaces.

As illustrated in FIG. 5, each locator pin 46 also has an enlarged end 54 that is received within a round opening 56 in the tool holder plate 36. Adjacent the round opening 56, the tool holder plate has a locating opening 58 which slidably supports the locator end 48 of the locator pin by slidably engaging its locating surfaces 50 shown in FIG. 6 so that the locating pin is accurately positioned about its associated axis A. The locator pin enlarged end 54 has a slightly smaller size than the tool holder round opening so that the actual rotational positioning of the locator pin is performed only by its locator end 48 and the tool holder plate locating opening 58.

Each broach tool 34 has a mounting surface 60 as shown in FIG. 5 for mounting on the tool support surface 40 of the associated tool holder plate 36. On generally diametrically opposite sides of its broaching opening 42 as shown in FIG. 3, each broach tool 34 has a pair of locating openings 62 that have central spaced and parallel axes A which, after locating of the broach tool, are concentric with the locating pin axes A. The broach locating openings 62 respectively receive the locating ends 48 of the associated pair of locating pins 46 upon mounting thereof on the tool holder plate. These locating openings 62 as shown in FIG. 5 each include a locating hole 64 of a smaller round shape and an enlarged wrench portion 66 by which the locator pin is rotated by a wrench 68 as shown in FIGS. 3 and 4. It should also be noted that the generally diametrically opposite positioning of the locating opening 62 can be angularly varied a few degrees, with each of the broach tools of a progressive set having different angular positioning with respect to each other so as to prevent inadvertent mounting of the wrong broach tool at any given position on the machine slide.

As shown in FIG. 6, the locating hole 64 of each locating opening of the broach tool has a plurality of circumferentially spaced round clearance surfaces 70 which are aligned but radially spaced from the locating surfaces 50 of the locating end 48 of the associated locating pin upon the initial mounting of the broach tool on the tool holder plate. The locating hole 64 of each locating opening of the broach tool also has a plurality of round locating surfaces 72 spaced circumferentially from each other about the associated axis A in an alternating relationship with the clearance surfaces 70 and having a smaller radius than the clearance surfaces. Normally the radial clearance between the pin end locating surfaces 50 and the broach tool clearance surfaces 70 during the initial mounting as illustrated in FIG. 6 will be about 0.002 to 0.003 of an inch for locating pins having an effective diameter of the locating surfaces 50 of about 0.25 of an inch, although this clearance can vary depending upon the broach tool involved and the consequent necessary diameter of the locator pin end.

After the initial mounting of the broach tool, which is facilitated by the clearance discussed above in connection with FIG. 6, the locator pins 46 are rotated by the wrench 68 illustrated in FIGS. 3 and 4 to rotate their locating surfaces 50 out of alignment with the broach hole clearance surfaces 70 and into alignment with the broach hole locating surfaces 72 as shown in FIG. 7. The locator pin locating surfaces 50 and the broach hole locating surfaces 72 have close-fitting diameters so as to provide accurate radial and axial positioning of the broach tool on the tool holder plate in a predetermined location.

As shown in FIG. 3, a plurality of clamps 74 clamp a peripheral clamping flange 76 of each located broach tool 34 to secure the broach tool in its located position provided by the locating pins 46 as described above. Each clamp 74 as shown in FIG. 4 includes a clamp member 78 that is received within an associated clamp hole 80 in the tool holder plate 36 and also includes a threaded bolt 82 that is threaded into a threaded portion of the clamp hole 80 to secure the clamp member 78 in position providing the clamping of the broach tool peripheral clamp 76 as shown in FIG. 3. The clamps 74 are unthreaded to release the broach tool for detachment which is performed after rotation of the locator pins from the position of FIG. 7 to the position of FIG. 6 to rotate the pin locating surfaces 50 out of contact with the broach tool hole locating surfaces 72 and into alignment with the broach tool hole clearance surfaces 70 so that the broach tool can be easily detached.

As illustrated in FIGS. 3 and 4 each of the tool holder plates 36 has a large end 84, a small end 86 and an intermediate portion 88 between its large and small ends. The large and small ends 84 and 86 and the intermediate portion 88 each have a pair of oppositely facing parallel surfaces 90 that are respectively spaced from each other by large, small and intermediate distances so a plurality of such tools can be positioned as shown in FIG. 3 adjacent each other with the adjacent tool holder plates oriented 180° from each other, such that the large ends 84 are adjacent the small ends 86 of adjacent tool holder plates with the intermediate portions 86 therebetween to provide relatively close positioning of the broach tools 34 mounted on the tool holder plates. This close positioning of the broach tools minimizes the distance that the machine must move each tool between each progressive broaching operation and thereby enables the machine to have a greater amount of progressive broaching steps for a given length of movement.

As shown in FIG. 4, the large end 84 of each tool holder plate has a junction 92 with the intermediate portion 90, and this junction has angular flat surfaces 94 that extend at 45° between the surfaces 90 of the large end and the intermediate portion. Likewise, the small end 86 has a junction 96 with the intermediate portion 88, and this junction has angular surfaces 98 that extend at 45° with respect to the surfaces 90 of the large end and the intermediate portion.

As best illustrated in FIG. 4, the pair of locator pins 46 are mounted by the associated pair of locating openings 58 in the tool holder plate on its intermediate portion 88 respectively adjacent the oppositely facing surfaces 90 of the intermediate portion. Furthermore, there are three of the clamps 74, two of which are mounted on the large end 84 of the tool holder plate respectively adjacent its oppositely facing surfaces 90, and one of which is mounted on the small end 86 of the tool holder plate generally midway between its oppositely facing surfaces 90. In addition, there are also four attachment bolts 100, and the tool holder plate includes four attachment bolt holes 102 through which the attachment bolts extend to attach the tool holder plate to the broaching machine slide. The four attachment holes 102 are located in pairs respectively adjacent the junctions 92 and 96 of the intermediate portion of the tool holder plate 36 with its large and small ends 84 and 86.

As best shown in FIGS. 6 and 7, the clearance surfaces 52 of the locator ends 48 of the pair of locator pins are flat and extend as chords between the adjacent locating surfaces 50 of the locator ends of the locator pins. More specifically, the locator end 48 of each locator pin has three locating surfaces 50 and three clearance surfaces 52. Each of the locating surfaces 50 extends the same angular extent about the associated axis A as the other locating surfaces. In addition, each clearance surface 52 extends as a chord with an angular extent about the associated axis A as each other clearance surface, and the clearance surfaces extend a slightly greater angular extent about the axis than the locating surfaces.

With continuing reference to FIGS. 6 and 7, the locating hole 64 of each locating opening of each broach tool has its clearance surfaces 70 provided with the same angular extent about the associated axis A as each other, and each broach hole locating surface 72 also has the same angular extent about the associated axis A as each other.

Figure 8:
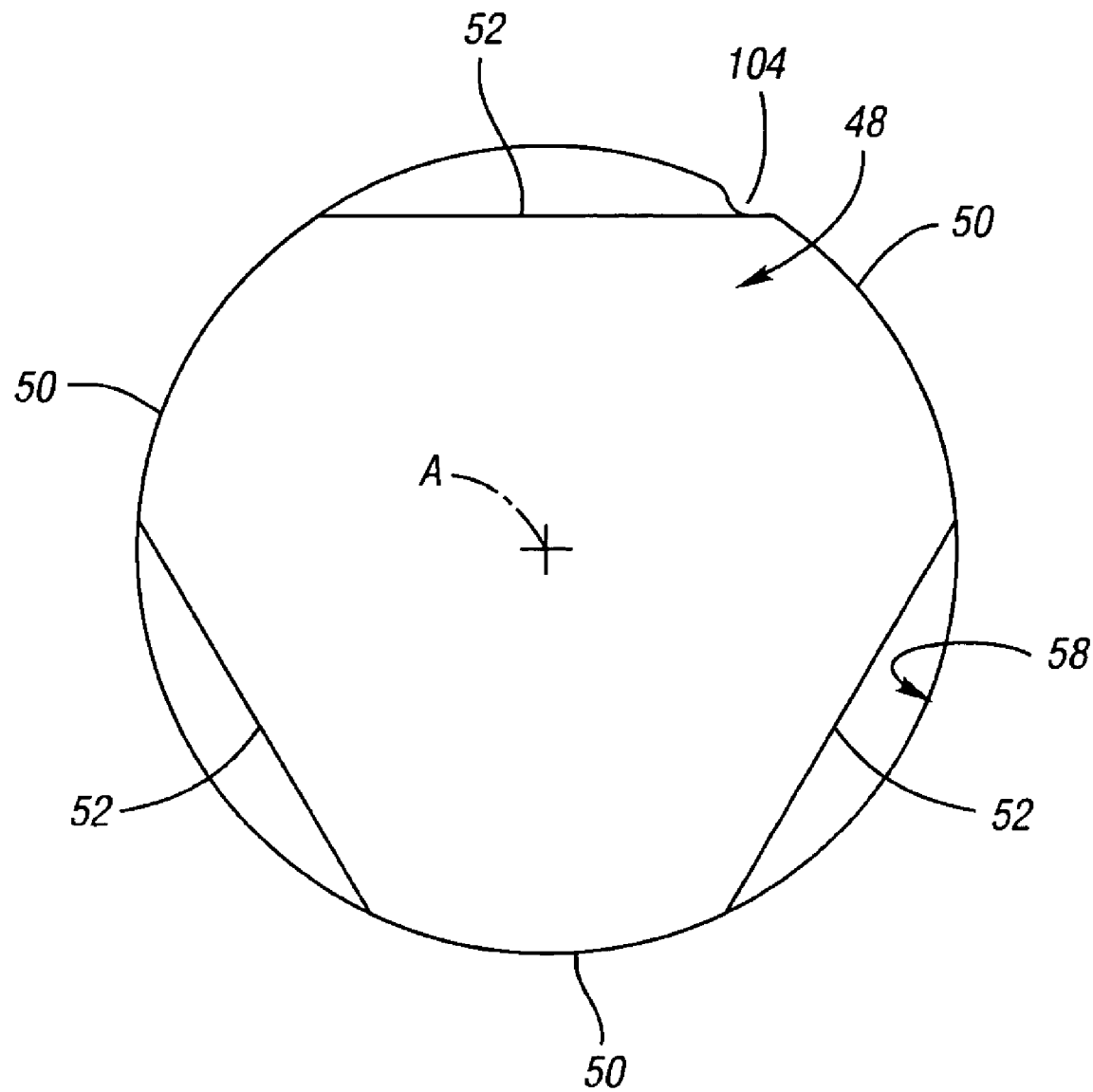
FIG. 8 is a schematic view taken along the direction of line 8—8 in FIG. 5 to illustrate the manner in which each locator pin is rotatably mounted on the tool holder plate with its rotational movement controlled by a stop.

With reference to FIG. 8, the tool holder plate has each of its locating openings 58 provided with a stop 104 that limits rotational movement of the locator pin and its locator end 48. This rotational locating of the locator pin end 48 provides alignment of its locating surfaces 50 with the clearance surfaces of the broach tool locating hole during the initial mounting of the broach tool to thereby facilitate this mounting.

As shown in FIGS. 3 and 4, each broach tool 34 has a pair of threaded holes 108 through which unshown bolts secure shims to the bottom side of the broach to accommodate for wear of the broach teeth. Holes 110 (FIG. 4) in the tool holder plate 36 receive the heads of such bolts so the broach tool can fully seat on the tool holder tool support surface 40 in surface-to-surface contact.

While the best mode for practicing the invention has been described in detail, those familiar with the art to which this invention relates will recognize various alternative designs and modes for practicing the invention as defined by the following claims.

What is claimed is:

1. A broach tool holding system comprising:
    a tool holder plate having a mounting surface for providing support thereof on a broaching machine and having a tool surface for mounting a broach tool for performing broaching;
    a pair of locator pins mounted on the tool holder plate for rotation about spaced axes that are parallel to each other, each locator pin having a locator end that projects from the tool holder plate and has round locating surfaces spaced circumferentially about the associated axis from each other, and the locator end of each locator pin having clearance surfaces circumferentially alternating with the round locating surfaces and extending therebetween at locations radially inward from the round locating surfaces, the round locating surfaces of the locator ends of the locator pins being rotational aligned with circumferentially spaced clearance surfaces in locating holes in the broach tool to facilitate initial positioning of the broach tool on the tool holder plate, and the locator pins being rotatable on the tool holder plate to rotate the locating surfaces thereof from alignment with the clearance surfaces in the locating holes of the broach tool into locating contact with circumferentially spaced locating surfaces in the locating holes in the broach tool to position the broach tool on the tool holder plate in a predetermined location; and
    clamps for securing the located broach tool on the tool holder plate for use and for selectively releasing the broach tool for detachment which is performed after rotation of the locator pins to rotate the locating surfaces thereof out of contact with the circumferentially spaced locating surfaces in the locating holes of the broach tool and into alignment with the clearance surfaces thereof to facilitate the detachment.

2. A broach tool holding system as in claim 1 wherein the tool holder plate has a large end, a small end and an intermediate portion between the large and small ends, the large and small ends and the intermediate portion each having a pair of oppositely facing parallel surfaces that are respectively spaced from each other by large, small and intermediate distances so a plurality of such tool holder plates can be positioned adjacent each other with the adjacent tool holder plates oriented 180 degrees from each other so the large ends are adjacent the small ends of adjacent tool holder plates with the intermediate portions therebetween to provide relatively close positioning of broach tools mounted on the tool holder plates.

3. A broach tool holding system as in claim 2 wherein the pair of locator pins are mounted on the intermediate portion of the tool holder plate respectively adjacent the oppositely facing surfaces of the intermediate portion.

4. A broach tool holding system as in claim 2 wherein there are three clamps, two of which are mounted on the large end of the tool holder plate respectively adjacent its oppositely facing surfaces, and one of which is mounted on the small end of the tool holder plate generally midway between its oppositely facing surfaces.

5. A broach tool holding system as in claim 2 further including four attachment bolts and wherein the tool holder plate includes four attachment bolt holes through which the attachment bolts extend to attach the tool holder plate to the broaching machine, and the four attachment holes being located in pairs respectively adjacent junctions of the intermediate portion of the tool holder plate with its large and small ends.

6. A broach tool holding system as in claim 2 wherein the pair of locator pins are mounted on the intermediate portion of the tool holder plate respectively adjacent the oppositely facing surfaces of the intermediate portion, wherein there are three clamps, two of which are mounted on the large end of the tool holder plate respectively adjacent its oppositely facing surfaces, and one of which is mounted on the small end of the tool holder plate generally midway between its oppositely facing surfaces, further including four attachment bolts, wherein the tool holder plate includes four attachment bolts holes through which the attachment bolts extend to attach the tool holder plate to the broaching machine, and the four attachment holes being located in pairs respectively adjacent junctions of the intermediate portion of the tool holder plate with its large and small ends.

7. A broach tool holding system as in claim 1 wherein the clearance surfaces of the locator ends of the pair of locator pins are flat and extend as chords between the adjacent locating surfaces of the locator ends of the pair of locator pins.

8. A broach tool holding system as in claim 1 wherein the locator end of each locator pin has three locating surfaces and three clearances surfaces.

9. A broach tool holding system as in claim 1 wherein the locator end of each locator pin has three locating surfaces and three clearances surfaces, and wherein the clearance surfaces of the locator ends of the pair of locator pins are flat and extend as chords between the adjacent locating surfaces of the locator ends of the pair of locator pins.

10. A broach tool holding system as in claim 1 wherein the tool holder plate includes a pair of locating openings that respectively receive the locating ends of the pair of locator pins, and each locating opening of the tool holder plate including a stop that provides rotational positioning of the associated locating pin for alignment of the locating surfaces thereof with the clearance surfaces in the locating holes of the broach tool to facilitate the broach tool mounting.

11. A broach tool holding system comprising:
    a tool holder plate having a mounting surface for providing support thereof on a broaching machine and having a tool surface for mounting a broach tool for performing broaching, the tool holder plate having a large end, a small end and an intermediate portion between the large and small ends, the large and small ends and the intermediate portion each having a pair of oppositely facing parallel surfaces that are respectively spaced from each other by large, small and intermediate distances so a plurality of such tool holder plates can be positioned adjacent each other with the adjacent tool holder plates oriented 180 degrees from each other so the large ends are adjacent the small ends of adjacent tool holder plates with the intermediate portions therebetween to provide relatively close positioning of broach tools mounted on the intermediate portions of the tool holder plates;
    four attachment bolts, the tool holder plate including four attachment bolt holes through which the attachment bolts extend to attach the tool holder plate to the broaching machine, and the four attachment holes being located in pairs respectively adjacent junctions of the intermediate portion of the tool holder plate with its large and small ends;

a pair of locator pins mounted on the intermediate portion of the tool holder plate respectively adjacent its oppositely facing surfaces for rotation about spaced axes that are parallel to each other, each locator pin having a locator end that projects from the tool holder plate and has round locating surfaces spaced circumferentially about the associated axis from each other, and the locator end of each locator pin having clearance surfaces circumferentially alternating with the round locating surfaces and extending therebetween at locations radially inward from the round locating surfaces, the round locating surfaces of the locator ends of the locator pins being rotational aligned with circumferentially spaced clearance surfaces in locating holes in the broach tool to facilitate initial positioning of the broach tool on the tool holder plate, and the locator pins being rotatable on the tool holder plate to rotate the locating surfaces thereof from alignment with the clearance surfaces in the locating holes of the broach tool into locating contact with circumferentially spaced locating surfaces in the locating holes in the broach tool to position the broach tool on the tool holder plate in a predetermined location;

the tool holder plate including a pair of locating openings that respectively receive the locating ends of the pair of locator pins, and each locating opening of the tool holder plate having a stop that provides rotational positioning of the associated locating pin for alignment of the locating surfaces thereof with the clearance surfaces in the locating holes of the broach tool to facilitate the broach tool mounting; and three clamps for securing the located broach tool on the tool holder plate for use and for selectively releasing the broach tool for detachment which is performed after rotation of the locator pins to rotate the locating surfaces thereof out of contact with the circumferentially spaced locating surfaces in the locating holes of the broach tool and into alignment with the clearance surfaces thereof to facilitate the detachment, two of the clamps being mounted on the large end of the tool holder plate respectively adjacent its oppositely facing surfaces, and one of the clamps being mounted on the small end of the tool holder plate generally midway between its oppositely facing surfaces.

12. A broach tool holding system comprising:

a tool holder plate having a mounting surface for providing support thereof on a broaching machine and having a tool surface for mounting a broach tool for performing broaching, the tool holder plate having a large end, a small end and an intermediate portion between the large and small ends, the large and small ends and the intermediate portion each having a pair of oppositely facing parallel surfaces that are respectively spaced from each other by large, small and intermediate distances so a plurality of such tool holder plates can be positioned adjacent each other with the adjacent tool holder plates oriented 180 degrees from each other so the large ends are adjacent the small ends of adjacent tool holder plates with the intermediate portions therebetween to provide relatively close positioning of broach tools mounted on the intermediate portions of the tool holder plates;

four attachment bolts, the tool holder plate including four attachment bolt holes through which the attachment bolts extend to attach the tool holder plate to the broaching machine, and the four attachment holes being located in pairs respectively adjacent junctions of the intermediate portion of the tool holder plate with its large and small ends;

a pair of locator pins mounted on the intermediate portion of the tool holder plate respectively adjacent its oppositely facing surfaces for rotation about spaced axes that are parallel to each other, each locator pin having a locator end that projects from the tool holder plate and has three round locating surfaces spaced circumferentially about the associated axis from each other, and the locator end of each locator pin having three flat clearance surfaces circumferentially alternating with the round locating surfaces and extending therebetween as chords with respect to the associated axis at locations radially inward from the round locating surfaces, the round locating surfaces of the locator ends of the locator pins being rotationally aligned with circumferentially spaced clearance surfaces in locating holes in the broach tool to facilitate initial positioning of the broach tool on the tool holder plate, and the locator pins being rotatable on the tool holder plate to rotate the locating surfaces thereof from alignment with the clearance surfaces in the locating holes of the broach tool into locating contact with circumferentially spaced locating surfaces in the locating holes in the broach tool to position the broach tool on the tool holder plate in a predetermined location;

the tool holder plate including a pair of locating openings that respectively receive the locating ends of the pair of locator pins, and each locating opening of the tool holder plate having a stop that provides rotational positioning of the associated locating pin for alignment of the locating surfaces thereof with the clearance surfaces in the locating holes of the broach tool to facilitate the broach tool mounting; and three clamps for securing the located broach tool on the tool holder plate for use and for selectively releasing the broach tool for detachment which is performed after rotation of the locator pins to rotate the locating surfaces thereof out of contact with the circumferentially spaced locating surfaces in the locating holes of the broach tool and into alignment with the clearance surfaces thereof to facilitate the detachment, two of the clamps being mounted on the large end of the tool holder plate respectively adjacent its oppositely facing surfaces, and one of the clamps being mounted on the small end of the tool holder plate generally midway between its oppositely facing surfaces.

13. A broach tool comprising:

a tool body having a mounting surface for mounting on a mounting surface of a broach tool holder plate;

a pair of locating holes extending through the tool body about associated spaced and parallel axes;

each locating hole having a plurality of round clearance surfaces spaced circumferentially from each other about its associated axis; and each locating hole having a plurality of round locating surfaces spaced circumferentially from each other about its associated axis in an alternating relationship with the clearance surfaces and having a smaller radius than the clearance surfaces.

14. A broach tool as in claim 13 wherein each locating hole has three round clearance surfaces and three round locating surfaces.

15. A broach tool comprising:

a tool body having a mounting surface for mounting on a mounting surface of a broach tool holder plate;

a pair of locating holes extending through the tool body about associated spaced and parallel axes;

each locating hole having three round clearance surfaces spaced circumferentially from each other about its associated axis;

each locating hole having three round locating surfaces spaced circumferentially from each other about its associated axis in an alternating relationship with the clearance surfaces and having a smaller radius than the clearance surfaces.

16. A method for mounting a broach tool comprising:

positioning the broach tool on a broach tool holder plate with a pair of rotatable spaced and parallel locator pins on the holder plate respectively extending into a pair of locating holes in the broach tool with circumferentially spaced locating surfaces of each locator pin in alignment with circumferentially spaced clearance surfaces of the associated locating hole to provide initial positioning of the broach tool on the holder plate;

rotating the locator pins to move the locating surfaces thereof into contact with circumferentially spaced locating surfaces of the locating holes to provide positioning of the broach tool in a predetermined location on the holder plate; and clamping the located broach tool on the holder plate for use.

17. A method for mounting a broach tool as in claim 16 wherein the locator pins are rotated by a wrench that contacts circumferentially spaced clearance surfaces which connect the locating surfaces of the locator pins.

18. A method for mounting a broach tool as in claim 16 wherein the rotation of each locator pin is terminated by an associated stop of the tool plate holder.

19. A method for mounting a broach tool as in claim 16 wherein after mounting the broach tool is selectively detached by unclamping the clamps and rotating the locator pins to realign their locating surfaces with the clearance surfaces of the locating holes of the broach tool in a manner that facilitates the detachment.

20. A method for mounting a broach tool comprising:

positioning the broach tool on a broach tool holder plate with a pair of rotatable spaced and parallel locator pins on the holder plate respectively extending into a pair of locating holes in the broach tool with circumferentially spaced locating surfaces of each locator pin in alignment with circumferentially spaced clearance surfaces of the associated locating hole to provide initial positioning of the broach tool on the holder plate;

rotating the locator pins by wrench actuation in contact with circumferentially spaced clearance surfaces of the locator pins to move the locating surfaces thereof into contact with circumferentially spaced locating surfaces of the locating holes of the broach tool to provide positioning of the broach tool in a predetermined location on the holder plate; and clamping the located broach tool on the holder plate for use.

* * * * *